United States Patent
Goto et al.

(10) Patent No.: US 11,306,981 B2
(45) Date of Patent: Apr. 19, 2022

(54) HEAT EXCHANGER

(71) Applicant: RINNAI CORPORATION, Nagoya (JP)

(72) Inventors: Yoshio Goto, Nagoya (JP); Daisuke Naito, Nagoya (JP); Shigeki Takeuchi, Nagoya (JP)

(73) Assignee: RINNAI CORPORATION, Nagoya (JP)

( * ) Notice: Subject to any disclaimer, the term of this patent is extended or adjusted under 35 U.S.C. 154(b) by 76 days.

(21) Appl. No.: 16/551,923

(22) Filed: Aug. 27, 2019

(65) Prior Publication Data

US 2020/0072504 A1 Mar. 5, 2020

(30) Foreign Application Priority Data

Aug. 30, 2018 (JP) .............................. JP2018-161136

(51) Int. Cl.
*F28F 9/00* (2006.01)
*F28D 9/00* (2006.01)
(Continued)

(52) U.S. Cl.
CPC ................ *F28F 9/001* (2013.01); *F16L 5/10* (2013.01); *F16L 19/07* (2013.01); *F16L 21/035* (2013.01);
(Continued)

(58) Field of Classification Search
CPC .... F28F 13/185; F28F 19/008; F28F 2265/26; F28F 9/001; F28F 9/002; F28F 9/005;
(Continued)

(56) References Cited

U.S. PATENT DOCUMENTS 7,712,327 B2 * 5/2010 Nelson .................... F25D 21/08
62/276
9,297,588 B2 * 3/2016 Takubo .................. B05B 16/60
(Continued)

FOREIGN PATENT DOCUMENTS

DE 102016100305 A1 7/2017
EP 1886086 B1 12/2016
(Continued)

OTHER PUBLICATIONS

Examination Report from the European Patent Office dated Feb. 20, 2020 in related EP application No. 19193698.8, including grounds for rejection, search report, and examined claims 1-15.
(Continued)

*Primary Examiner* — Michael G Hoang
*Assistant Examiner* — Andrew W Cheung
(74) *Attorney, Agent, or Firm* — J-Tek Law PLLC; Jeffrey D. Tekanic; Scott T. Wakeman (57) ABSTRACT

A heat exchanger (1) includes a heat exchanging body (20) disposed within an outer box (10). A supply pipe (21) and a discharge pipe (22) in fluid communication with the heat exchanging body (20) respectively extend through first and second insertion holes (31, 32) in the outer box (10). Elastic seal members (40; 240) are respectively provided around the supply pipe (21) and the discharge pipe (22) and between a first sidewall (11) of the outer box (10) and the heat exchanging body (20). At least one biasing member (50; 250) exerts a lateral biasing force (F1; F2) on the elastic seal members (40; 240), thereby maintaining the elastic seal members (40; 240) in a state of compressive deformation and contacting the outer box (10) and the heat exchanging body (20) in an air-tight manner to block potential leakage paths (LP1; LP2) via the insertion holes (31, 32).

9 Claims, 8 Drawing Sheets (51) Int. Cl.

| | |
|---|---|
| *F16L 5/10* | (2006.01) |
| *F16L 41/08* | (2006.01) |
| *F24H 9/13* | (2022.01) |
| *F28F 9/02* | (2006.01) |
| *F28F 9/007* | (2006.01) |
| *F16L 21/035* | (2006.01) |
| *F24H 1/14* | (2022.01) |
| *F24H 8/00* | (2022.01) |
| *F16L 19/07* | (2006.01) |
| *F24H 9/20* | (2022.01) |
| *F28D 21/00* | (2006.01) |
| *F02M 26/06* | (2016.01) |

(52) U.S. Cl.
CPC ............ *F16L 41/088* (2013.01); *F24H 1/145* (2013.01); *F24H 8/00* (2013.01); *F24H 9/139* (2022.01); *F28D 9/0031* (2013.01); *F28F 9/002* (2013.01); *F02M 26/06* (2016.02); *F24H 9/2035* (2013.01); *F28D 9/0043* (2013.01); *F28D 21/0007* (2013.01); *F28D 2021/0082* (2013.01); *F28F 9/0075* (2013.01); *F28F 9/0226* (2013.01)

(58) Field of Classification Search
CPC .......... F28F 9/0226; F28F 9/04; F28F 9/0075; F23C 9/00; F23C 9/006; F24H 1/107; F24H 1/145; F24H 1/38; F24H 1/40; F24H 8/00; F24H 8/006; F24H 9/128; F24H 9/146; F24H 9/2035; F24H 1/0036; F24H 9/144; F24H 9/142; F24H 1/52; F24H 9/001; F28D 1/06; F28D 17/023; F28D 19/047; F28D 19/048; F28D 2021/0042; F28D 2021/0098; F28D 21/0007; F28D 7/12; F28D 9/0043; F28D 2021/0082; F28D 9/0031; Y10T 428/215; F16J 15/3284; F16L 55/178; F16L 5/08; F16L 19/07; F16L 21/035; F16L 41/088; F16L 5/10; F24F 13/30; F02M 26/06; F01N 2240/02
USPC ........................................................ 122/18.4
See application file for complete search history.

(56) References Cited

U.S. PATENT DOCUMENTS

| | | | |
|---|---|---|---|
| 2005/0126197 A1* | 6/2005 | Kim .................... | F28F 1/32 62/275 |
| 2005/0204713 A1* | 9/2005 | Wu ..................... | B01D 46/10 55/496 |
| 2008/0229763 A1* | 9/2008 | Nelson ................ | F28D 1/0477 62/81 |
| 2011/0155079 A1* | 6/2011 | Matsunaga ......... | F28F 9/22 122/15.1 |
| 2012/0001395 A1* | 1/2012 | Kurth .................. | F16J 15/453 277/412 |
| 2012/0061053 A1* | 3/2012 | Geskes ................ | F28F 21/067 165/67 |
| 2013/0264037 A1* | 10/2013 | Otsubo ................ | F28D 21/0007 165/157 |
| 2014/0020866 A1* | 1/2014 | Bluetling ............. | F28F 3/00 165/104.19 |
| 2014/0138071 A1* | 5/2014 | Odillard .............. | F02B 29/0475 165/164 |
| 2014/0300105 A1* | 10/2014 | Kalbacher ........... | F28F 9/0248 285/351 |
| 2016/0116228 A1* | 4/2016 | Huang ................. | F24H 1/145 122/18.2 |
| 2016/0313073 A1* | 10/2016 | Larsson .............. | F28F 9/0075 |
| 2017/0038168 A1* | 2/2017 | Arndt .................. | F28F 9/001 |
| 2017/0089644 A1* | 3/2017 | Petersen ............. | F28F 9/0246 |
| 2017/0328597 A1 | 11/2017 | Miura | |
| 2018/0164039 A1* | 6/2018 | Seo ...................... | F28G 9/00 |
| 2018/0306520 A1 | 10/2018 | Kolder et al. | |

FOREIGN PATENT DOCUMENTS

| | | | | |
|---|---|---|---|---|
| EP | 3128253 A1 | | 2/2017 | |
| WO | WO-2006004509 A1 * | | 1/2006 | ............ F02M 26/35 |
| WO | 2006125919 A1 | | 11/2006 | |
| WO | WO-2017122987 A1 * | | 7/2017 | ............ F28F 9/0246 |

OTHER PUBLICATIONS

Examination Report from the European Patent Office dated Nov. 17, 2020 in related EP application No. 19193698.8, including grounds for rejection and examined claims of the Main Request and the 1st Auxiliary Request.

* cited by examiner

HEAT EXCHANGER

CROSS-REFERENCE

The present application claims priority to Japanese patent application serial number 2018-161136 filed on Aug. 30, 2018, the contents of which are incorporated fully herein by reference.

TECHNICAL FIELD

The present invention relates to a heat exchanger.

BACKGROUND ART

A heat exchanger is disclosed in Japanese Laid open Patent Translation No. 2017-512966, the corresponding U.S. Patent Application 2017/0059205, and the corresponding European Patent Publication EP 3128253. This heat exchanger comprises an outer box, a heat exchanging body, a supply pipe, a discharge pipe, and a plurality of insertion holes.

In this heat exchanger, a second fluid (water) is supplied, by the supply pipe, to a second passageway of the heat exchanging body. In addition, heat is exchanged, by the heat exchanging body, between a first fluid (combustion exhaust gas) that circulates through a first passageway and the second fluid that circulates through the second passageway. Thereafter, the second fluid from the second passageway is discharged by the discharge pipe.

In such a heat exchanger, it is necessary to block leakage paths that extend from the first passageway to the outside of the outer box via the insertion holes. Consequently, a configuration can be used in which, for example, prior to forming a peripheral wall of the outer box into a tube shape by welding or the like, the heat exchanging body is brazed to a circumferential edge of each insertion hole in a sidewall.

However, in such an embodiment, there is a risk that the brazing portions will tend to be affected by sidewall warpage due to the welding or the like, dimensional variation in the heat exchanging body, etc. Consequently, it may be difficult to ensure airtightness. As a result, in such a known heat exchanger, there has been a risk that the first fluid (combustion exhaust gas) will leak from the first passageway to the outside of the outer box via the insertion holes.

SUMMARY OF THE INVENTION

It is therefore one non-limiting object of the present disclosure to provide a heat exchanger in which leakage of a first fluid from a first passageway to the outside of an outer box via insertion holes can be more reliably impeded or blocked.

Accordingly, a heat exchanger of one aspect of the present disclosure comprises:
- an outer box that partitions a first passageway, through which a first fluid circulates, by using a tube shaped peripheral wall comprising a first sidewall;
- a heat exchanging body, which is housed inside the first passageway of the outer box and in which a second passageway through which a second fluid circulates is provided, the heat exchanging body performs heat exchange between the first fluid and the second fluid;
- a supply pipe that protrudes from the heat exchanging body toward (through) the first sidewall and supplies the second fluid to the second passageway;
- a discharge pipe that protrudes from the heat exchanging body toward (through) the first sidewall and discharges the second fluid from the second passageway;
- a plurality of insertion holes formed such that they pass through the first sidewall, and from (through) which the supply pipe and the discharge pipe protrude to the outside of the outer box;
- elastic seal members provided between the first sidewall and the heat exchanging body and that block leakage paths extending from the first passageway to the outside of the outer box via the insertion holes; and
- a (or at least one) biasing member that causes the elastic seal members to undergo compressive deformation by exerting a biasing force on the elastic seal members in a first direction that is parallel to the penetrating direction of the insertion holes.

In such a heat exchanger, elastic seal members are compressed and deformed by a biasing member that exerts a biasing force in a first direction, which is parallel to the penetration direction of insertion holes, on the elastic seal members, which are provided between a first sidewall and a heat exchanging body. As a result thereof, the elastic seal members tend not to be affected by warpage of the sidewall due to welding or the like, dimensional variation in the heat exchanging body, etc. and therefore can reliably block leakage paths extending from a first passageway to the outside of an outer box via the insertion holes.

Accordingly, in such a heat exchanger of the present disclosure, leakage of a first fluid from the first passageway to the outside of the outer box via the insertion holes can be more reliably impeded than in known heat exchangers.

In another aspect of the present disclosure, the heat exchanging body may include a plurality of plates stacked along the first direction. In the past, there has been a tendency for dimensional variations in the heat exchanging body to become large in the first direction due to the stacking of plates. However, because the sealing effect/performance of the elastic seal members, which are biased (pressed) by the biasing member, tends not to be affected by such dimensional variations, leakage of the first fluid from the first passageway to the outside of the outer box via the insertion holes can be reliably impeded.

In another aspect of the present disclosure, the peripheral wall may include a second sidewall that opposes the first sidewall in the first direction, and the biasing member is preferably disposed between the second sidewall and the heat exchanging body so as to exert the biasing force in a direction (e.g., the first direction or parallel thereto) that presses the heat exchanging body toward the first sidewall. In such an embodiment, the biasing force applied by the biasing member against the heat exchanging body easily acts on the elastic seal members to cause the elastic seal members to undergo compression deformation. Consequently, leakage of the first fluid from the first passageway to the outside of the outer box via the insertion holes can be reliably impeded.

In another aspect of the present disclosure, the outer box preferably has an insertion opening, in which one end side of the peripheral wall is open, the heat exchanging body, the supply pipe, and the discharge pipe are housed, by being passed through the insertion opening, inside the first passageway of the outer box, and the biasing member is installed, by being inserted through the insertion opening, between the second sidewall and the heat exchanging body. In such an embodiment, it is easy to perform the work of forming the peripheral wall of the outer box into a tubular shape by welding or the like and subsequently housing (disposing) the heat exchanging body, a supply pipe, and a discharge pipe inside the first passageway of the outer box and inserting the biasing member between a second sidewall and the heat exchanging body.

In another aspect of the present disclosure, the biasing member preferably comprises: a plate shaped member, which makes contact with one of the second sidewall and the heat exchanging body, and a leaf spring that is fixed to the plate shaped member and makes contact, in an elastically deformed state, with the other of the second sidewall and the heat exchanging body. In addition, the direction parallel to the direction in which the biasing member is inserted, through the insertion opening, between the second sidewall and the heat exchanging body is defined as a second direction. Furthermore, the leaf spring is bent such that an intermediate area in the second direction bulges toward the other of the second sidewall and the heat exchanging body. Thus, by providing the biasing member with the plate shaped member and the bendable leaf spring, the biasing member can be easily inserted by sliding it between the second sidewall and the heat exchanging body. Furthermore, the biasing member can reliably press the heat exchanging body toward the first sidewall in such an embodiment.

In another aspect of the present disclosure, the plate shaped member preferably has a plurality of protruding parts that protrude toward the first sidewall and make contact with the heat exchanging body, the leaf spring makes contact with the second sidewall and, as viewed along the first direction, the insertion holes respectively overlap the corresponding protruding parts. In such an embodiment, the biasing force of the biasing member presses the heat exchanging body and thereby acts upon the elastic seal members via protruding parts of the plate shaped member and the heat exchanging body.

In another aspect of the present disclosure, the leaf spring is affixed to the plate shaped member on only the end part located on the side opposite the insertion opening in the second direction. In such an embodiment, the restoring force of the leaf spring tends to weaken (is reduced) in the initial stage of inserting the biasing member between the second sidewall and the heat exchanging body. As a result, the biasing member can be much more easily inserted between the second sidewall and the heat exchanging body. In addition, in this embodiment, after the biasing member has been inserted between the second sidewall and the heat exchanging body, the heat exchanging body can be reliably pressed toward the first sidewall while the leaf spring suitably follows any dimensional variation(s) of the heat exchanging body.

In another aspect of the present disclosure, one end side of the biasing member may be moored to (e.g., contact, pressed against) the first sidewall and the other end side of the biasing member may be moored to (e.g., coupled to, engaged in) the heat exchanging body. In such an embodiment, the biasing member exerts a biasing force that pulls the heat exchanging body toward the first sidewall. Therefore, the biasing force of the biasing member acts upon the elastic seal member by pulling the heat exchanging body. In other words, the biasing member squeezes (compresses) the elastic seal member in the space between the heat exchanger body and the first sidewall, thereby robustly blocking a potential leakage path that extends via the corresponding insertion hole.

Other aspects and advantages of the present disclosure and invention will become apparent upon considering the working examples disclosed in the description below in view of the attached drawings, the diagrams exemplified in those drawings, and the concept of the invention disclosed in the specification and all those drawings.

DETAILED DESCRIPTION OF EMBODIMENTS

Working examples 1, 2 according to the present disclosure are explained below, with reference to the drawings.

Working Example 1

Figure 1:
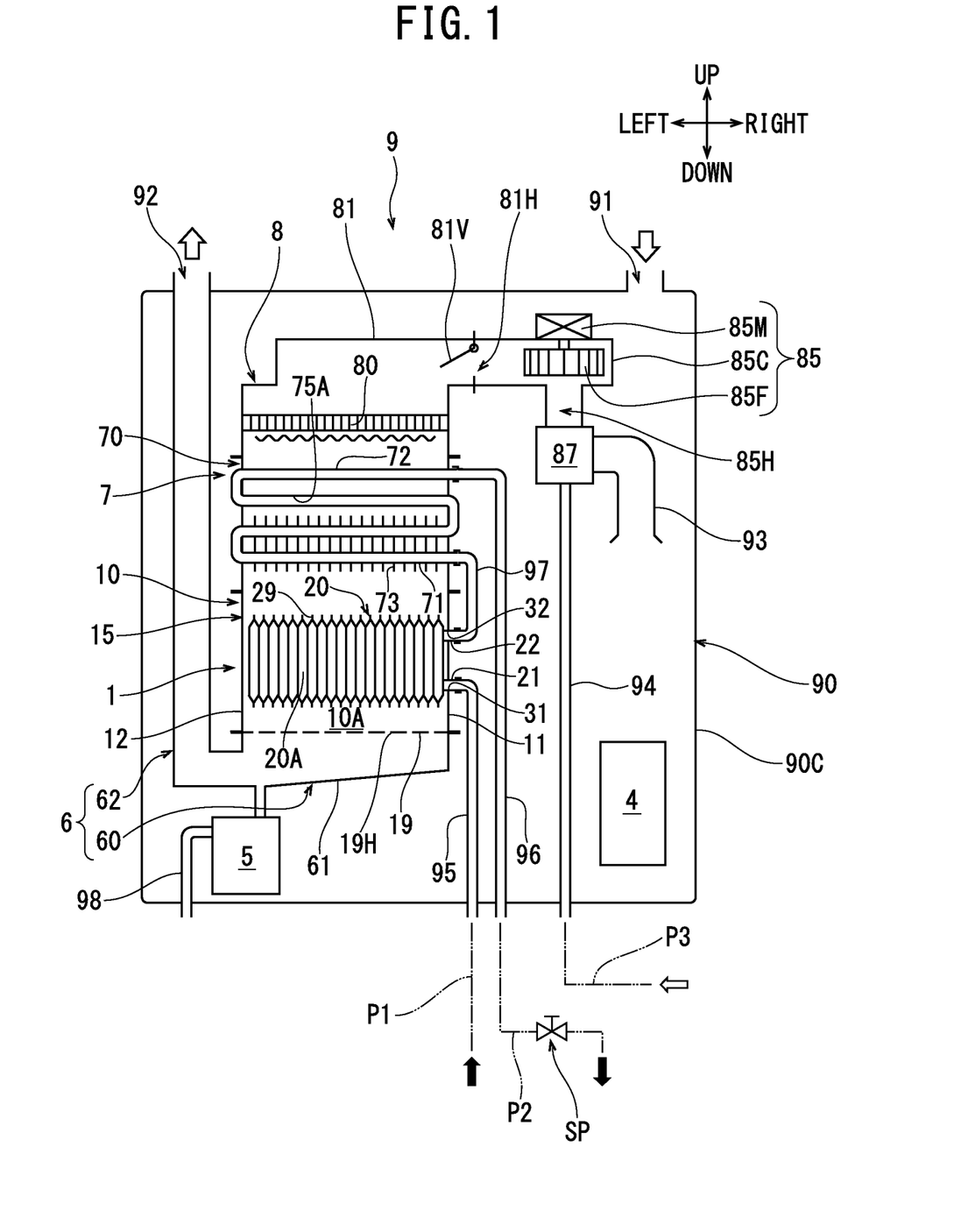
FIG. 1 is a schematic drawing of a hot water heater in which a heat exchanger of working example 1 is utilized.

As shown in FIG. 1, a heat exchanger 1 of working example 1 is one representative, non-limiting example of an embodiment of a heat exchanger according to the present disclosure and it is utilized in a hot water heater 9. The hot water heater 9 comprises an outer case 90. The outer case 90 comprises a case main body 90C and a front surface panel, which is not shown. The case main body 90C is a substantially rectangular box shaped body which has an opening formed on the near side of the paper surface of FIG. 1. The front surface panel is located on the near side of the paper surface of FIG. 1 and covers the opening of the case main body 90C.

In the explanation below, the front surface panel side of the outer case 90, i.e. the near side of the paper surface of FIG. 1, is defined as forward; and when viewing the hot water heater 9 while facing the front surface panel of the outer case 90, the side located to the left, i.e. the left side of the paper surface of FIG. 1, is defined as leftward. Furthermore, the front, rear, left, right, up, and down directions shown in FIG. 2 and subsequent figures are all displayed such that they correspond to the directions in FIG. 1.

Configuration of the Hot Water Heater

As shown in FIG. 1, the hot water heater 9 comprises the outer case 90, a burner 8, a control circuit 4, a sensible heat exchanger 7, the heat exchanger (a latent heat exchanger) 1, an air exhaust duct 6, and a condensate neutralizer 5. The burner 8, the control circuit 4, the sensible heat exchanger 7, the heat exchanger 1, the air exhaust duct 6, and the condensate neutralizer 5 are each housed within the outer case 90.

An air inlet 91 and an exhaust port 92 are provided in an upper wall of the outer case 90. Air from outside of the outer case 90 is drawn into the outer case 90 via the air inlet 91.

Combustion exhaust gas that has been guided to the air exhaust duct 6 is exhausted to the outside of the outer case 90 via the exhaust port 92.

A gas inlet pipe 94, a water intake pipe 95, and a hot water outflow pipe 96 are disposed inside the outer case 90, and lower ends thereof protrude from a lower wall of the outer case 90. The lower end of the gas inlet pipe 94 is connected to (in fluid communication with) a gas pipe P3 for supplying fuel gas (e.g., natural gas) from a (not-shown) gas supply source. The lower end of the water intake pipe 95 is connected to (in fluid communication with) a water supply pipe P1 for supplying water from a (not-shown) water supply source. The lower end of the hot water outflow pipe 96 is connected to (in fluid communication with) a hot water supply pipe P2 for supplying hot water to a hot water outflow destination SP, such as a faucet, a shower, or the like.

The burner 8 comprises a burner body 81, a combustion plate 80, a combustion fan unit 85, and a premixer 87.

The burner body 81 is disposed in an upper part of the inside of the outer case 90. The burner body 81 is a substantially box shaped structure having a square-tube shaped peripheral wall; an opening is formed on (in) a lower surface side thereof. A gas inlet port 81H is provided at an upper part of a right side surface of the burner body 81 such that it projects rightward. A check valve 81V is provided in the gas inlet port 81H.

The combustion plate 80 is provided in a lower surface opening of the burner body 81 such that the combustion plate 80 is surrounded by the peripheral wall of the burner body 81. The combustion plate 80 has a plurality of burner holes.

The combustion fan unit 85 comprises a fan case 85C, a combustion fan 85F, and a fan motor 85M.

The fan case 85C is connected to the gas inlet port 81H of the burner body 81 and is provided such that a gas inlet 85H projects downward. The combustion fan 85F is housed in the fan case 85C. The combustion fan 85F is rotationally driven by the fan motor 85M, which is affixed to an outer portion (outer surface) of the fan case 85C.

The premixer 87 is disposed downward (upstream) of the combustion fan unit 85 and is connected to the gas inlet 85H. The premixer 87 includes a mixing valve, which is not shown. An upper end of the gas inlet pipe 94 is connected to (in fluid communication with) the premixer 87. In addition, one end of an air supply pipe 93 is connected to (in fluid communication with) the premixer 87 and the other end opens to the interior of the outer case 90.

The control circuit 4 is an electrical circuit that operates from when the hot water heater 9 starts until it stops and that controls the entire operation of the hot water heater 9. For example, the control circuit 4 performs control such as: igniting and extinguishing the burner 8; adjusting the rotational speed of the fan motor 85M, which rotationally drives the combustion fan 85F; adjusting the degree of opening of the (not-shown) mixing valve of the premixer 87; and the like.

The sensible heat exchanger 7 comprises a boiler body 70. The boiler body 70, which is shown in a simplified manner in FIG. 1, comprises a square-tube shaped peripheral wall; openings are respectively formed on (in) an upper surface side and a lower surface side of the square-tube shaped peripheral wall. The upper surface opening of the boiler body 70 is connected to (in fluid communication with) the lower surface opening of the burner body 81.

As shown in FIGS. 1 to 4, the heat exchanger 1 comprises an outer box 10. The outer box 10 comprises a square-tube shaped peripheral wall 15; openings are respectively formed on (in) an upper surface side and a lower surface side thereof.

Figure 2:
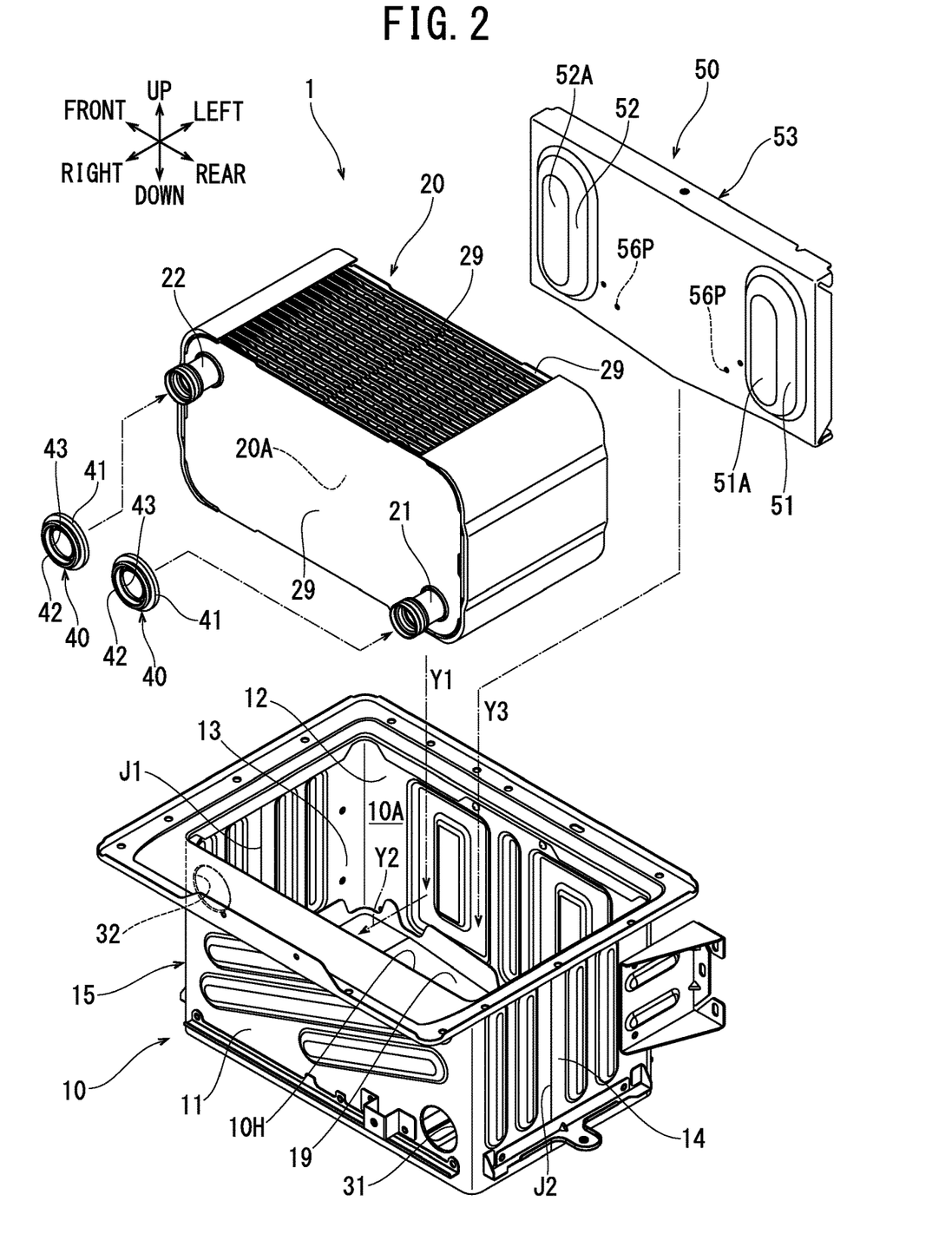
FIG. 2 is an exploded oblique view of the heat exchanger according to working example 1.

As shown in FIG. 2, the peripheral wall 15 comprises a first sidewall 11, a second sidewall 12, a third sidewall 13, and a fourth sidewall 14. The upper surface opening of the outer box 10 serves as an insertion opening 10H, at which an upper end side of the peripheral wall 15 is open.

The first sidewall 11 is a substantially flat plate that constitutes the right surface of the peripheral wall 15. The second sidewall 12 is a substantially flat plate that constitutes the left surface of the peripheral wall 15; the second sidewall 12 opposes the first sidewall 11 in the left-right direction. The third sidewall 13 is a substantially flat plate that constitutes the front surface of the peripheral wall 15. The fourth sidewall 14 is a substantially flat plate that constitutes the rear surface of the peripheral wall 15; the fourth sidewall 14 opposes the third sidewall 13 in the front-rear direction.

In the present embodiment, the first sidewall 11 and the right portions of the third sidewall 13 and the forth sidewall 14 are a single steel plate that is folded substantially into a C-shape. The second sidewall 12 and the left portions of the third sidewall 13 and the forth sidewall 14 are a single steel plate that is folded substantially into a C-shape. By welding and brazing these two steel plates together along joining lines J1, J2 shown in FIG. 2, the first sidewall 11, the second sidewall 12, the third sidewall 13, and the fourth sidewall 14 are joined rigidly and with high airtightness.

First and second insertion holes 31, 32 are formed in the first sidewall 11. The first insertion hole 31 is a round hole that passes through a rear lower corner portion of the first sidewall 11 in a penetration direction parallel to the left-right direction. The second insertion hole 32 is a round hole that passes through a front upper corner portion of the first sidewall 11 in the penetration direction parallel to the left-right direction. The left-right direction is one example of a "first direction" according to the present disclosure.

Figure 4:
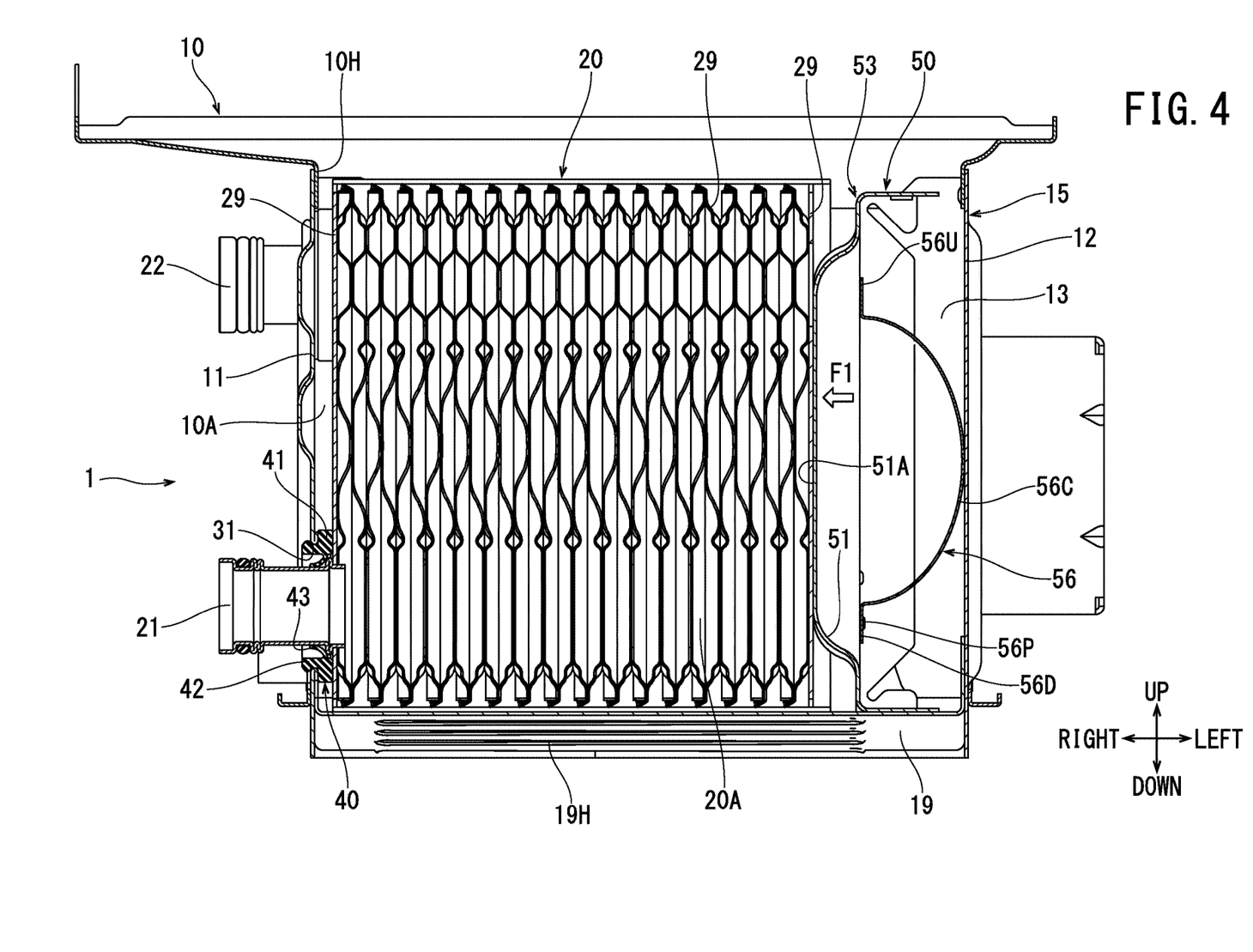
FIG. 4 is a cross sectional view that shows a cross section taken along line A-A in FIG. 3.

As shown in FIGS. 1 and 4, a bottom wall 19 is assembled (joined) onto the lower surface opening of the outer box 10. The bottom wall 19 has a plurality of vents 19H. The upper surface opening of the outer box 10 is connected to (in fluid communication with) the lower surface opening of the boiler body 70.

As shown in FIG. 1, the air exhaust duct 6 comprises a bottom cover 60 and an air exhaust tube body 62. The bottom cover 60 comprises a square-tube shaped peripheral wall; an opening is formed on an upper surface side thereof. A lower surface side of the bottom cover 60 is closed up by an inclined bottom wall 61.

The upper surface opening of the bottom cover 60 is connected to (in fluid communication with) the lower surface opening of the outer box 10. The air exhaust tube body 62 is connected to a lower part of a left side surface of the bottom cover 60, extends leftward therefrom, and subsequently bends and extends upward. An upper end of the air exhaust tube body 62 is connected to (in fluid communication with) the exhaust port 92.

The condensate neutralizer 5 is coupled to the lowest part of the bottom wall 61 of the bottom cover 60. The interior of the condensate neutralizer 5 is filled with a neutralizing agent, which is not shown. An upper end of a condensate discharge pipe 98 is connected to (in fluid communication with) the condensate neutralizer 5. The lower end of the condensate discharge pipe 98 protrudes from the lower wall of the outer case 90.

The boiler body 70 of the sensible heat exchanger 7, the outer box 10 of the heat exchanger 1, and the air exhaust duct 6 partition a heating medium pathway, through which the combustion exhaust gas generated by the burner 8 is caused to circulate and then be discharged from the exhaust port 92.

The peripheral wall 15 of the outer box 10 of the heat exchanger 1 partitions (defines in part) a first passageway 10A, which is one section of the heating medium pathway. The combustion exhaust gas that circulates (flows) through the first passageway 10A is one example of a "first fluid" according to the present disclosure.

The sensible heat exchanger 7 is designed to recover sensible heat in the combustion exhaust gas circulating (flowing) inside the boiler body 70 and to heat the water supplied from the water supply pipe P1. The sensible heat exchanger 7 comprises first heat transfer pipes 71, heat transfer fins 73, and second heat transfer pipes 72.

The first heat transfer pipes 71 and the heat transfer fins 73 are disposed in a lower part of the interior of the boiler body 70. A plurality of the first heat transfer pipes 71 is provided such that pipes, which have a substantially elliptical shape in cross section, extend in the left-right direction between a left sidewall and a right sidewall of the boiler body 70. The heat transfer fins 73 comprise a plurality of flat plates disposed at prescribed spacings in the left-right direction; the first heat transfer pipes 71 are inserted through the heat transfer fins 73.

The second heat transfer pipes 72 are disposed in an upper part of the interior of the boiler body 70. A plurality of the second heat transfer pipes 72 is provided such that pipes, which have a substantially circular shape in cross section, extend in the left-right direction between the left sidewall and the right sidewall of the boiler body 70.

By connecting ends of each of the pipes 71, 72 in series, the first heat transfer pipes 71 and the second heat transfer pipes 72 constitute (form) a single sensible heat exchange pathway 75A that meanders in the interior of the boiler body 70. The pipe end of the discharge side of the second heat transfer pipe 72, which constitutes the downstream end of the sensible heat exchange passageway 75A, is connected to (in fluid communication with) the upper end of the hot water outflow pipe 96, which constitutes the outlet path of the hot water to the hot water supply pipe P2. The pipe end of the supply side of the first heat transfer pipe 71, which constitutes the upstream end of the sensible heat exchange passageway 75A, is connected to (in fluid communication with) an upper end of a coupling pipe 97.

The heat exchanger 1 is designed to recover latent heat in the combustion exhaust gas (in particular, latent heat in water vapor in the combustion exhaust gas that undergoes a phase transition to liquid water in the heat exchanger 1) that passes through the interior of the boiler body 70 and circulates (flows) through the first passageway 10A inside the outer box 10, and to thereby heat the water supplied from the water supply pipe P1. In other words, the heat exchanger 1 pre-heats the water prior to supplying it to the sensible heat exchanger 7. As shown in FIGS. 1 to 4, the heat exchanger 1 comprises a heat exchanging body 20, a supply pipe 21, a discharge pipe 22, first and second elastic seal members 40, and a biasing member (elastically-deformable spacer) 50.

The heat exchanging body 20 is housed inside the first passageway 10A of the outer box 10. The heat exchanging body 20 comprises a plurality of metal plates 29 that are joined to one another such that they are stacked (disposed in parallel) along the left-right direction. A second passageway 20A is provided in the interior of the heat exchanging body 20.

The second passageway 20A is a single hollow part that is partitioned by the plates 29. The second passageway 20A is capable of circulating the water supplied from the water supply pipe P1. The water that circulates (flows) through the second passageway 20A is one example of a "second fluid" according to the present disclosure.

As shown in FIGS. 2 and 4, the plate 29 located rightmost and the plate 29 located leftmost in the heat exchanging body 20 are flat plates whose wall thickness is thicker than the other plates 29. These two plates constitute the left and right outer surfaces of the heat exchanging body 20.

The supply pipe 21 is a circular tube made of metal. The supply pipe 21 is joined to the rear lower corner part of the right surface of the heat exchanging body 20 and is in fluid communication with the upstream end of the second passageway 20A. The supply pipe 21 and the heat exchanging body 20 are joined, in a highly airtight manner, by brazing. The supply pipe 21 protrudes rightward toward and through the first sidewall 11.

The discharge pipe 22 is also a circular tube made of metal. The discharge pipe 22 is joined to the front upper corner part of the right surface of the heat exchanging body 20 and is in fluid communication with the downstream end of the second passageway 20A. The discharge pipe 22 and the heat exchanging body 20 are joined, in a highly airtight manner, by brazing. The discharge pipe 22 protrudes rightward toward and through the first sidewall 11.

As shown in FIGS. 1, 2, and 4, the supply pipe 21 projects outward from the outer box 10 through the first insertion hole 31 of the first sidewall 11. The discharge pipe 22 projects outward from the outer box 10 through the second insertion hole 32 of the first sidewall 11.

As shown in FIG. 1, one end of the supply pipe 21 is connected to (in fluid communication with) the upper end of the water intake pipe 95, which constitutes the inlet path of the water from the water supply pipe P1. One end of the discharge pipe 22 is connected to (in fluid communication with) the lower end of the coupling pipe 97. The supply pipe 21 supplies the water from the water supply pipe P1 to the second passageway 20A. The discharge pipe 22 discharges that water from the second passageway 20A to the sensible heat exchange passageway 75A.

As shown in FIG. 2, the supply pipe 21 and the discharge pipe 22 are respectively inserted through the first and second elastic seal members 40. The elastic seal members 40 are formed, into a circular ring shape, of an elastic material (e.g., an elastomer that is elastically deformable) that excels in heat resistance and chemical resistance, such as rubber.

Figure 5:
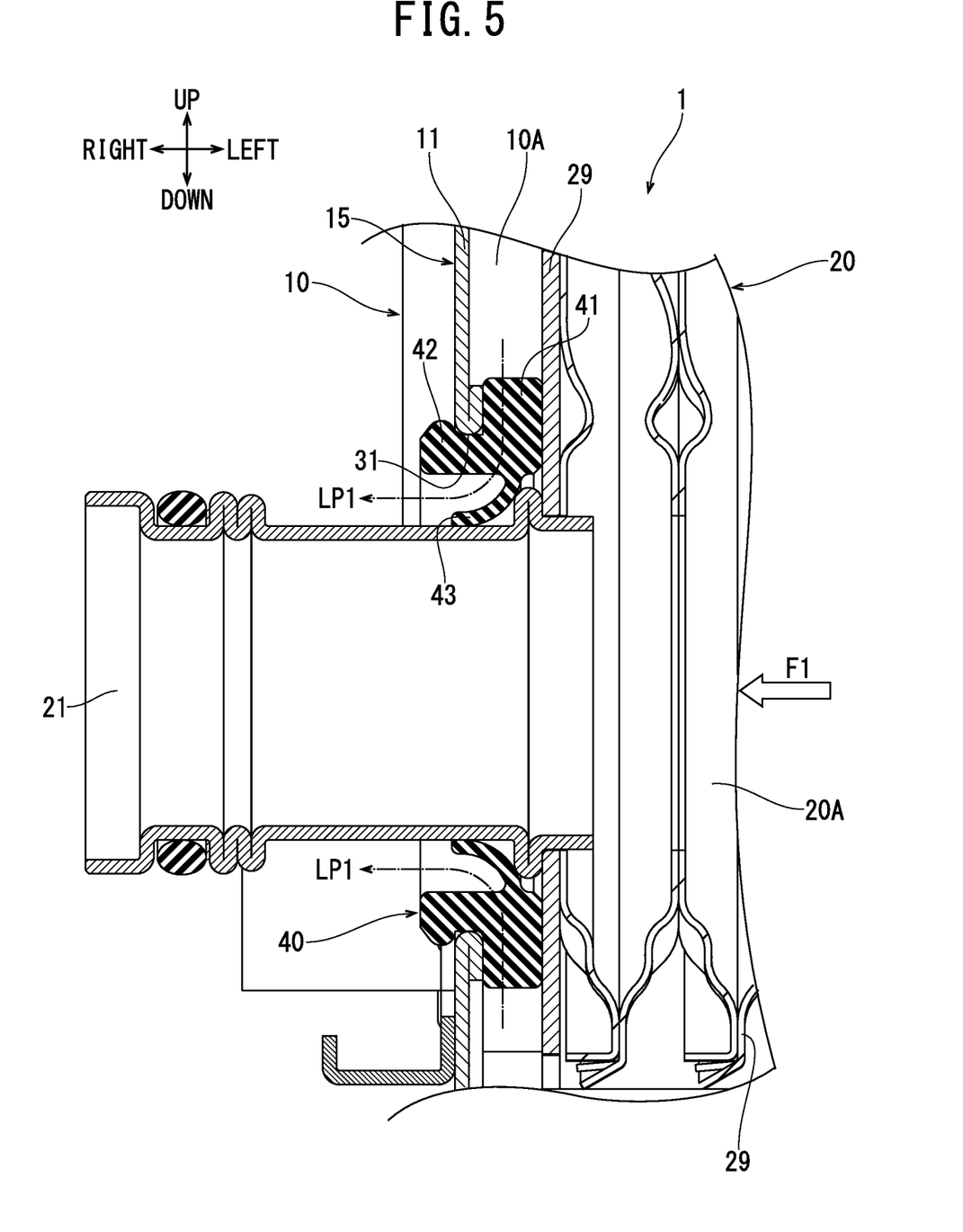
FIG. 5 is an enlarged cross sectional view of the principal parts shown in FIG. 4.

FIGS. 4 and 5 show cross sectional configurations of the first elastic seal member 40, through which the supply pipe 21 is inserted. The cross sectional configuration of the second elastic seal member 40 through which the discharge pipe 22 is inserted is preferably the same as the cross sectional configuration of the first elastic seal member 40, and therefore illustration and explanation of the second elastic seal member 40 is omitted. However, the first and second elastic seal members 40 optionally may have different configurations in some embodiments of the present teachings.

As shown by the enlarged view in FIG. 5, the elastic seal member 40 comprises a seal main body 41, an engaging part 42, and a lip 43. The left surface of the seal main body 41, which has a circular ring shape, is in tight contact (preferably air-tight contact) with the right surface of the heat exchanging body 20. The right surface of the seal main body 41 is in tight contact (preferably air-tight contact) with the circumferential edge that surrounds the insertion hole 31 on the left surface of the first sidewall 11. The engaging part 42, which is substantially tubular shaped, protrudes rightward from the seal main body 41, passes through the insertion hole 31 of the first sidewall 11, and subsequently widens and engages the circumferential edge that surrounds the insertion hole 31 on the right surface of the first sidewall 11. The lip 43 protrudes in a radially inward direction from an inner tube surface of the seal main body 41 and is in tight contact (preferably air-tight contact) with an outer tube surface of the supply pipe 21.

The elastic seal members 40 are configured in this manner to block potential leakage paths LP1, which extend from the first passageway 10A to the outside of the outer box 10 via the first and second insertion holes 31, 32. More specifically, the seal main bodies 41 are provided between the left surface of the first sidewall 11 and the right surface of the heat exchanging body 20 and serve as the primary leakage pathway blocking member. The engaging parts 42 and the lips 43 assist the seal main bodies 41 in providing the leakage pathway blocking function.

Figure 3:
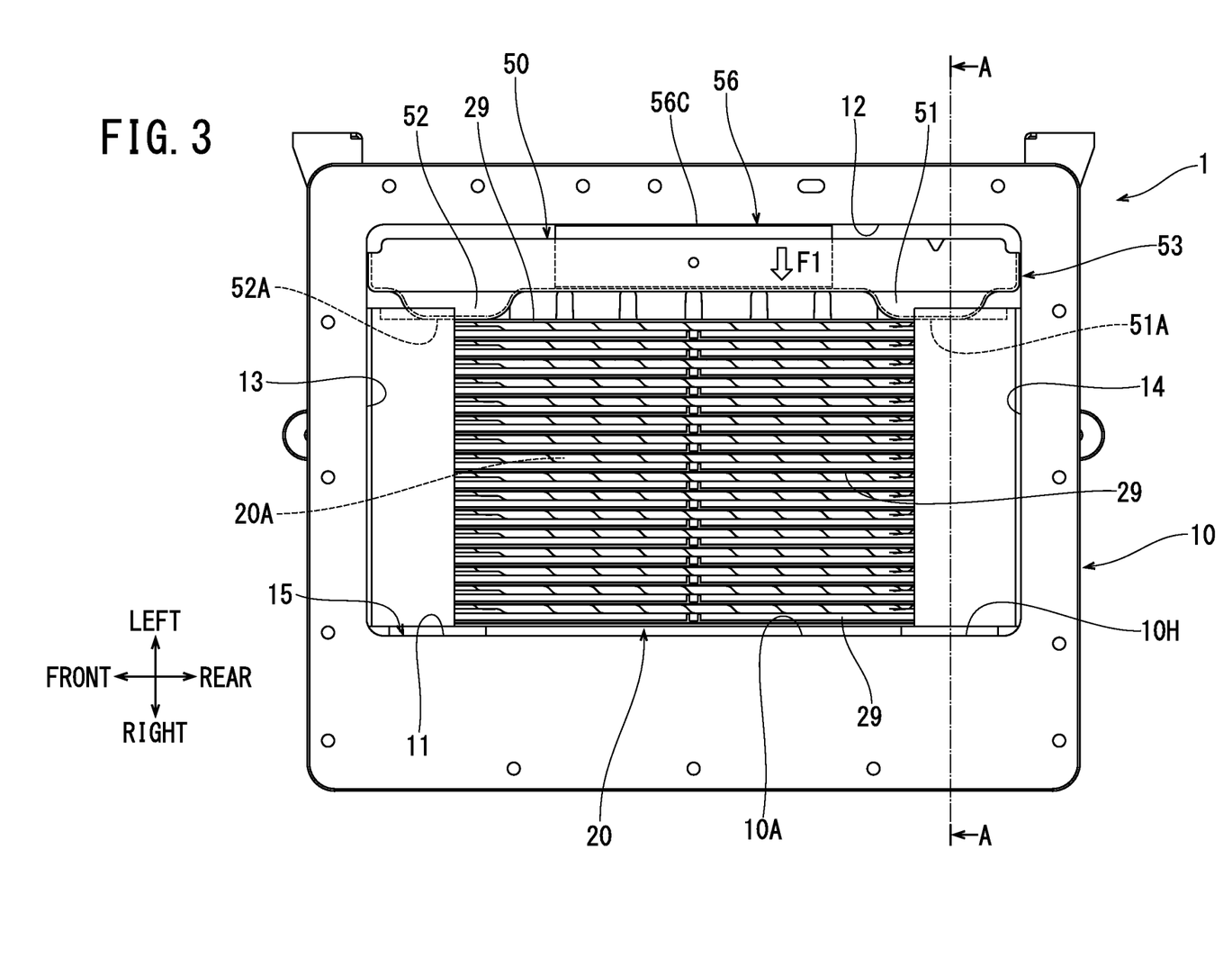
FIG. 3 is a top view of the heat exchanger according to working example 1.

As shown in FIGS. 3 and 4, the biasing member 50 is disposed between the right surface of the second sidewall 12 and the left surface of the heat exchanging body 20. As shown in FIGS. 2-4 and 6, the biasing member 50 comprises a plate shaped member 53 and a leaf spring 56.

Figure 6:
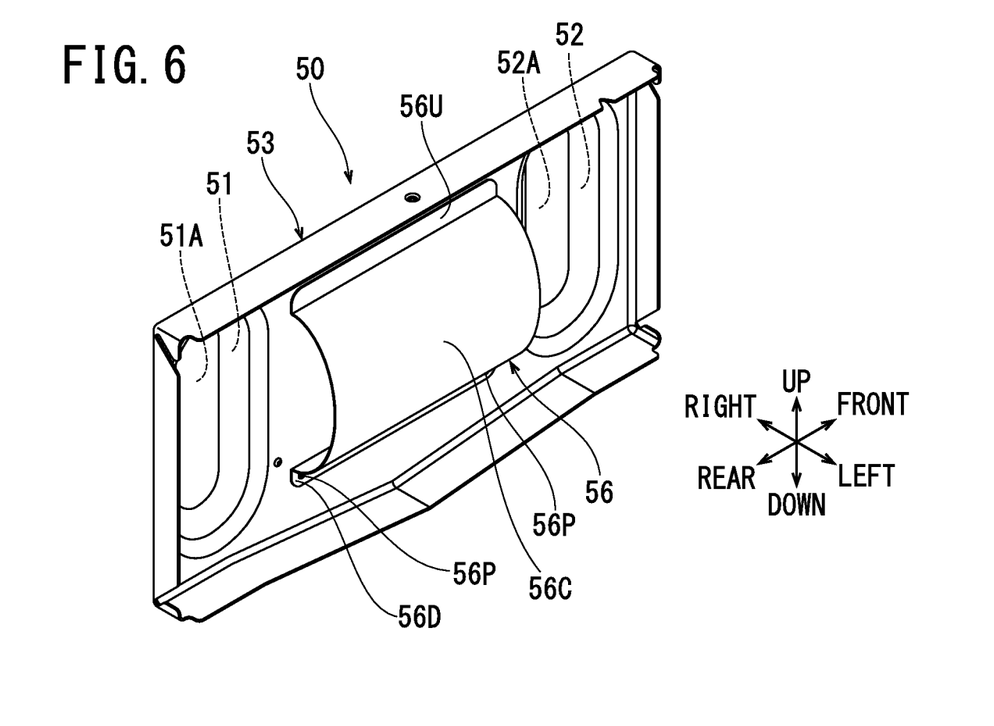
FIG. 6 is an oblique view of a biasing member.

The plate shaped member 53 is a substantially rectangular flat plate made of metal and extends in the front-rear direction and the up-down direction; each of its four sides is bent leftward into a rib shape or flange. The plate shaped member 53 has first and second protruding parts 51, 52. The first protruding part 51 is formed on a rear end side of the plate shaped member 53. The second protruding part 52 is formed on a front end side of the plate shaped member 53.

As shown in FIG. 2, the first protruding part 51 and the second protruding part 52 preferably have identical shapes, and each protrudes rightward toward the first sidewall 11. The right surface 51A of the first protruding part 51 and the right surface 52A of the second protruding part 52 are each a flat surface that has an oval shape that is elongated in the up down direction.

As shown in FIGS. 3 and 4, the plate shaped member 53 contacts the left surface of the heat exchanging body 20 at the right surface 51A of the first protruding part 51 and at the right surface 52A of the second protruding part 52.

Figure 7:
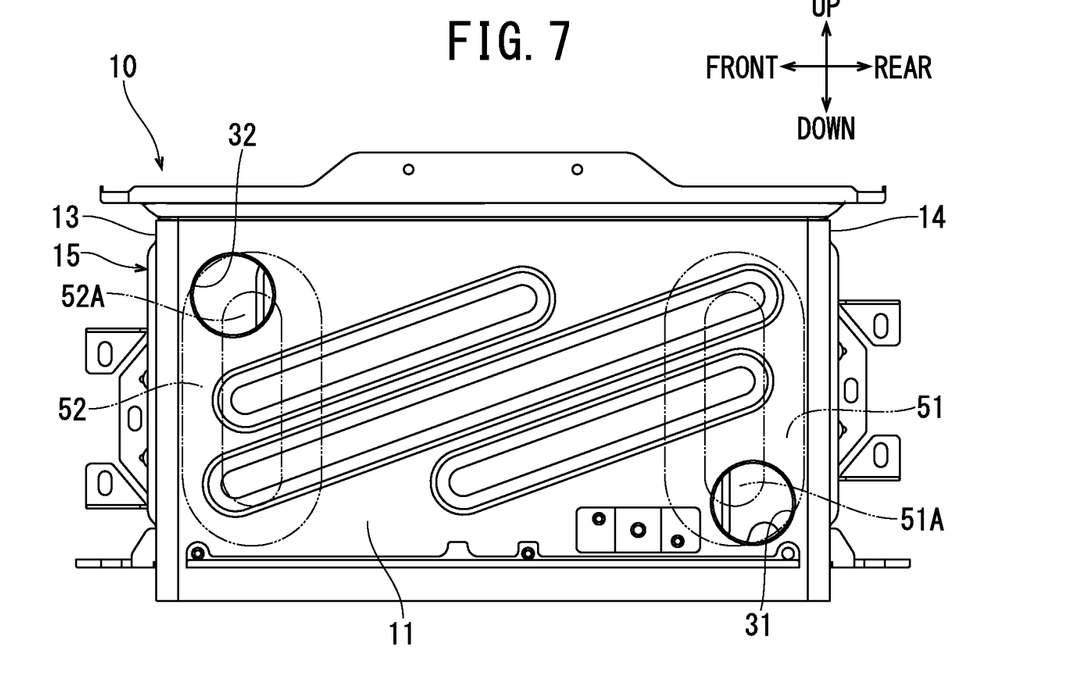
FIG. 7 is a side view that shows the relative positional relationships between insertion holes of an outer box and protruding parts of a plate shaped member.

In FIG. 7, the left-right direction is the depth direction of the paper surface. The first and second protruding parts 51, 52, which are indicated by chain double dashed lines in FIG. 7, correspond to the state in which the biasing member 50 is disposed between the right surface of the second sidewall 12 and the left surface of the heat exchanging body 20. Viewed along the left-right direction, the first insertion hole 31 of the first sidewall 11 overlaps a lower end portion of the right surface 51A of the first protruding part 51, and the second insertion hole 32 of the first sidewall 11 overlaps an upper end portion of the right surface 52A of the second protruding part 52. In other words, a first line extending in the left-right direction intersects the first insertion hole 31 and the first protruding part 51 and a second line extending in the left-right direction, which second line is parallel to the first line, intersects the second insertion hole 32 and the second protruding part 52.

As shown in FIGS. 4 and 6, the leaf spring 56 is manufactured by bending a substantially rectangular flat plate, which is made of metal. The leaf spring 56 is disposed such that it opposes the left surface of the plate shaped member 53 and is located between the first protruding part 51 and the second protruding part 52 in the front-rear direction. The leaf spring 56 is bent (curved) into an arch shape such that an intermediate area 56C in the up-down direction bulges leftward toward the second sidewall 12.

In the leaf spring 56, the end part located on the side opposite the insertion opening 10H in the up-down direction, i.e. a lower end part 56D, and the end part located on the insertion opening 10H side in the up-down direction, i.e. an upper end part 56U, are bent such that they are parallel to the plate shaped member 53.

The lower end part 56D of the leaf spring 56 is affixed to the plate shaped member 53 by being spot welded to the plate shaped member 53 at a plurality of joining points 56P. On the other hand, the upper end part 56U of the leaf spring 56 merely makes contact with the plate shaped member 53 without being affixed thereto.

As shown in FIGS. 3 and 4, when the biasing member 50 is disposed between the right surface of the second sidewall 12 and the left surface of the heat exchanging body 20, the leaf spring 56 is elastically deformed (compressed) owing to the intermediate area 56C contacting the right surface of the second sidewall 12 such that it compresses in the left-right direction and thereby exerts a rightward biasing force F1 on the heat exchanging body 20.

Because of the biasing force F1, the biasing member 50 presses the heat exchanging body 20 rightward toward the first sidewall 11 and thereby narrows the spacing between the left surface of the first sidewall 11 and the right surface of the heat exchanging body 20.

Thus, as shown in FIG. 5, the biasing member 50 exerts the rightward biasing force F1 in a direction that is parallel to the penetration direction of the first and second insertion holes 31, 32, thereby causing the seal main bodies 41 of the first and second elastic seal members 40, which are disposed between the left surface of the first sidewall 11 and the right surface of the heat exchanging body 20, to be compressed and deformed in the left-right direction. As a result, owing to the restoring force of the compressed seal main bodies 41, the seal main bodies 41 reliably make tight contact (preferably air-tight contact) with the left surface of the first sidewall 11 and the right surface of the heat exchanging body 20. Therefore, in the compressed state, the first and second elastic seal members 40 can reliably block the potential leakage paths LP1 via the first and second insertion holes 31, 32.

Figure 8:
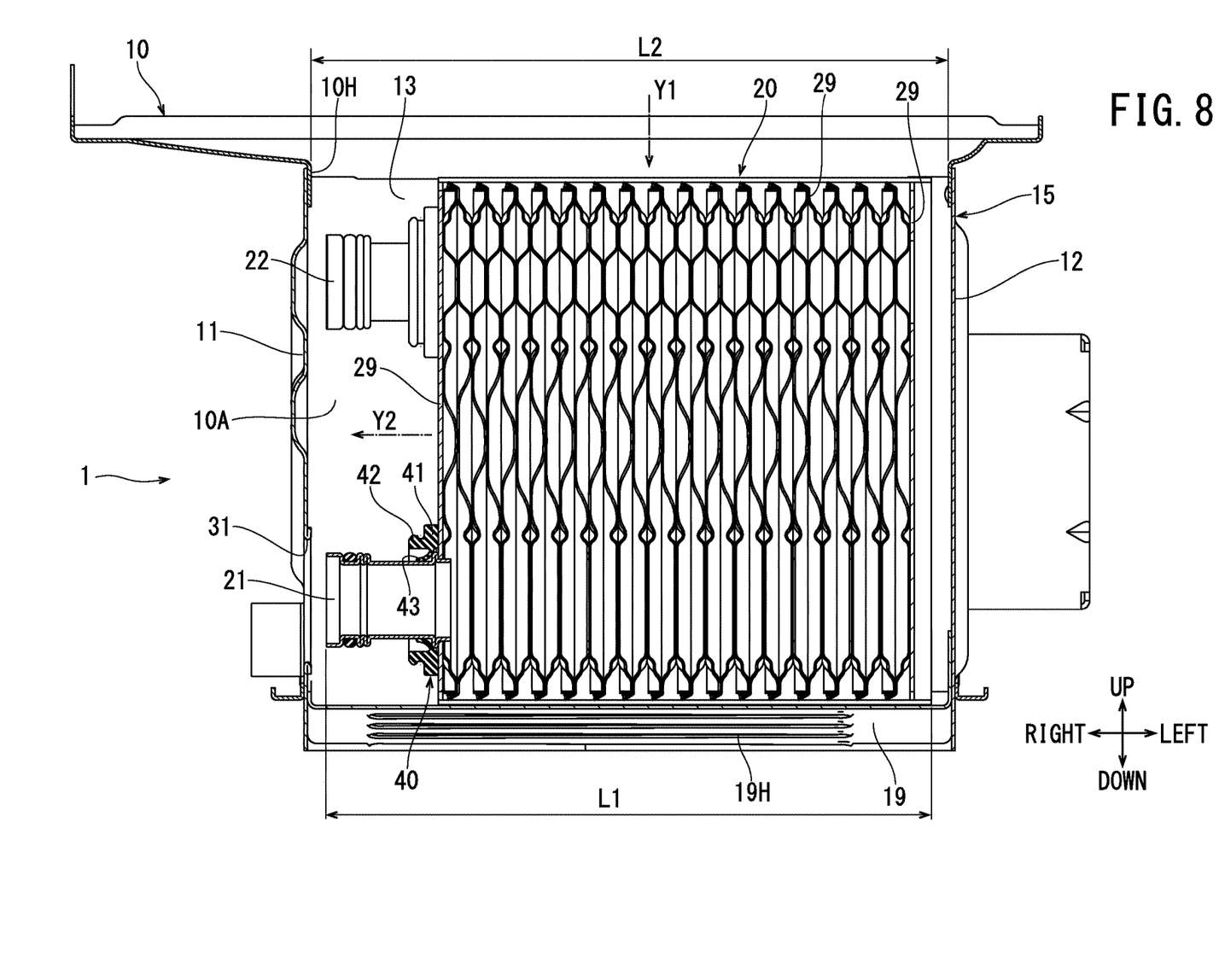
FIG. 8 is a cross sectional view, similar to that shown in FIG. 4, and is a view that explains a procedure for housing a heat exchanging body inside a first passageway of the outer box.

It is noted that, as shown in FIG. 8, the left-right direction length L1 of the supply pipe 21, the discharge pipe 22, and the heat exchanging body 20 is set to be smaller than the length L2 by which the first sidewall 11 and the second sidewall 12 of the outer box 10 are spaced apart.

In order to assemble the heat exchanger 1, the heat exchanging body 20 is first housed (disposed) within the first passageway 10A of the outer box 10 by moving the heat exchanging body 20, which has the supply pipe 21 and the discharge pipe 22 brazed thereon and the first and second elastic seal members 40 respectively disposed around the supply pipe 21 and the discharge pipe 22, from a position above the outer box 10 downward, as shown by arrow Y1 in FIGS. 2 and 8, through the insertion opening 10H and into the interior of the outer box 10.

Then, as shown by arrow Y2 in FIGS. 2 and 8, by moving the heat exchanging body 20 rightward inside the first passageway 10A, the supply pipe 21 passes through the first insertion hole 31 and protrudes to the outside of the outer box 10 and the discharge pipe 22 passes through the second insertion hole 32 and protrudes to the outside of the outer box 10. As a result, the first and second elastic seal members 40 are caused to be compressed between the first sidewall 11 and the rightmost plate 29 of the heat exchanging body 20, thereby effectively blocking (sealing) the potential leakage paths LP1 via the first and second insertion holes 31, 32, as shown in FIG. 4.

Lastly, as shown by arrow Y3 in FIG. 2, by moving the biasing member 50 from a position above the outer box 10 downward through the insertion opening 10H and into the interior of the outer box 10, the biasing member 50 can be disposed (inserted) between the right surface of the second sidewall 12 and the left surface of the heat exchanging body 20, thereby causing the biasing force F1 of the biasing member 50 to act upon (press) the first and second elastic seal members 40 and maintaining the first and second elastic seal members 40 in the compressed state. The up-down direction parallel to the direction in which the biasing member 50 is inserted, through the insertion opening 10H, between the second sidewall 12 and the heat exchanging body 20 is one example of a "second direction" according to the present disclosure.

Hot Water Supply Operation of the Hot Water Heater

As shown in FIG. 1, the hot water heater 9 generates and supplies hot water under control of the control circuit 4, as described below.

When the control circuit 4 starts the control of the hot water supply operation, the control circuit 4 adjusts the degree of opening of the (not-shown) mixing valve in the premixer 87, and causes the combustion fan 85F of the combustion fan unit 85 to rotate. As a result thereof, the premixer 87 intakes, through the air supply pipe 93, air drawn into the outer case 90 via the air inlet 91 and mixes that air with the fuel gas (e.g., natural gas) introduced from the gas pipe P3 to generate an air-gas mixture. Furthermore, by rotating the combustion fan 85F, the air-gas mixture of the fuel gas and the air is introduced into the fan case 85C from the premixer 87 and is then supplied into the burner body 81.

The burner 8 discharges, owing to the air supply pressure of the combustion fan 85F, the air-gas mixture, which was supplied into the burner body 81, downward from the burner holes of the combustion plate 80 and combusts such, thereby generating combustion exhaust gas. The amount of combustion of the burner 8 is adjusted by changing the rotational speed of the fan motor 85M to increase or decrease the air-gas supply pressure of the combustion fan 85F.

The check valve 81V opens the gas inlet port 81H during rotation of the combustion fan 85F and closes the gas inlet port 81H when the combustion fan 85F is stopped. Thereby, the air-gas mixture supplied into the burner body 81, strongly acidic water vapor generated from the surfaces of the heat exchanging body 20, and the like are prevented from flowing in reverse back into the fan case 85C of the combustion fan unit 85, the premixer 87, and the outer case 90.

The (hot) combustion exhaust gas generated by the burner 8 circulates (flows) inside the boiler body 70 of the sensible heat exchanger 7, circulates (flows) through the first passageway 10A inside the outer box 10 of the heat exchanger 1, is guided to the air exhaust tube body 62 by the bottom cover 60 of the air exhaust duct 6, and is ultimately discharged from the exhaust port 92 to the outside of the outer case 90.

The water supplied from the water supply pipe P1 is supplied to the hot water supply pipe P2 via the water intake pipe 95, the supply pipe 21, the second passageway 20A, the discharge pipe 22, the coupling pipe 97, the sensible heat exchange passageway 75A, and the hot water outflow pipe 96.

The sensible heat exchanger 7 recovers, by using the first heat transfer pipes 71, the heat transfer fins 73, and the second heat transfer pipes 72, the sensible heat in the combustion exhaust gas circulating (flowing) inside the boiler body 70 and heats the water circulating (flowing) through the sensible heat exchange passageway 75A.

The heat exchanger 1 recovers, by using the plates 29 of the heat exchanging body 20, the latent heat in the combustion exhaust gas (i.e. heat dissipated when water vapor in the combustion exhaust gas phase-transitions (condenses) into liquid water) that passes through the inside of the boiler body 70 and circulates (flows) through the first passageway 10A inside the outer box 10 and heats the water supplied from the water supply pipe P1 and that circulates (flows) through the second passageway 20A.

While the latent heat and the sensible heat in the combustion exhaust gas are being recovered by the heat exchanger 1 and the sensible heat exchanger 7, respectively, condensate forms on the surfaces of the heat exchanging body 20, the first heat transfer pipes 71, the heat transfer fins 73, and the second heat transfer pipes 72.

After the condensate has dripped onto the bottom wall 61 of the bottom cover 60 and collected in the lowest part of the bottom wall 61, the condensate passes through the condensate neutralizer 5. Then, after the condensate, which is acidic, has been neutralized by the neutralizing agent inside the condensate neutralizer 5, the condensate is discharged to the outside of the outer case 90 via the condensate discharge pipe 98.

Thus, after the hot water heater 9 heats the water, which is supplied from the water supply pipe P1 to the heat exchanger 1 and to the sensible heat exchanger 7, by absorbing heat from the combustion exhaust gas generated by the burner 8 and thereby turns that water into hot water of a desired temperature, the hot water heater 9 supplies the hot water to the hot water outflow destination SP through the hot water supply pipe P2.

Functions and Effects

In the heat exchanger 1 of working example 1, as shown in FIGS. 4, 5, etc., the biasing member 50 exerts a rightward biasing force F1, which is parallel to the penetration direction of the first and second insertion holes 31, 32, on the seal main bodies 41 of the elastic seal members 40, which are provided between the left surface of the first sidewall 11 and the right surface of the heat exchanging body 20, and thereby causes compression deformation of the seal main bodies 41 in the left-right direction. As a result, the seal main bodies 41 reliably tightly contact (preferably in an air-tight manner) the left surface of the first sidewall 11 and the right surface of the heat exchanging body 20. Owing to the elastic nature of the elastic seal members 40, the sealing effect/function of the elastic seal members 40 tends not to be affected by warpage of the peripheral wall 15 due to welding or the like, any dimensional variations in the heat exchanging body 20, and the like, and therefore can reliably block the potential leakage paths LP1, e.g., shown in FIG. 5, even for relatively broad manufacturing (engineering) tolerances.

Accordingly, in the heat exchanger 1 of working example 1, leakage of the combustion exhaust gas from the first passageway 10A to the outside of the outer box 10 via the first and second insertion holes 31, 32 can be reliably impeded.

In addition, as shown in FIG. 4, etc., the heat exchanging body 20 includes a plurality of the plates 29 stacked along the left right direction. Owing to this parallel arrangement of multiple plates 29, there is a tendency for dimensional variations of the heat exchanging body 20 (which are manufactured in a mass production facility) in the left-right direction to become large. However, because the first and second elastic seal members 40, which are biased by the biasing member 50, can readily compensate for any such dimensional variation owing to the variable compressive deformation of the elastic seal members 40 that adjusts to the actual amount of dimensional variation, leakage of the combustion exhaust gas from the first passageway 10A to the outside of the outer box 10 via the first and second insertion holes 31, 32 can be reliably impeded.

Furthermore, as shown in FIG. 4, because the biasing member 50 is disposed between the right surface of the second sidewall 12 and the left surface of the heat exchanging body 20, the heat exchanging body 20 exerts the biasing force F1, which presses rightward toward the first sidewall 11. Consequently, because the biasing force F1 of the biasing member 50 acts on the elastic seal members 40 via the heat exchanging body 20, the elastic seal members 40 undergo compressive deformation in the left-right direction, and therefore leakage of the combustion exhaust gas from the first passageway 10A to the outside of the outer box 10 via the first and second insertion holes 31, 32 can be reliably impeded.

In addition, as shown by arrows Y1, Y2 in FIGS. 2 and 8, the heat exchanging body 20 is manufactured by first brazing the supply pipe 21 and the discharge pipe 22 and then placing the first and second elastic seal members 40 respectively around the supply pipe 21 and the discharge pipe 22. Then, this entire assembly is inserted through the insertion opening 10H of the outer box 10 into the first passageway 10A of the outer box 10. Then, as shown by arrow Y3 in FIG. 2, the biasing member 50 is inserted, through the insertion opening 10H, between the right surface of the second sidewall 12 and the left surface of the heat exchanging body 20. Owing to this configuration of the heat exchanger 1, it is easy to perform the work of forming the peripheral wall 15 of the outer box 10 into a tube shape by welding or the like and subsequently housing the heat exchanging body 20, the supply pipe 21, and the discharge pipe 22 inside the first passageway 10A of the outer box 10 and inserting the biasing member 50 between the second sidewall 12 and the heat exchanging body 20.

Furthermore, as shown in FIGS. 4, 6, etc., the biasing member 50 comprises the plate shaped member 53, which contacts the left surface of the heat exchanging body 20, and the leaf spring 56, which is affixed to the plate shaped member 53 and contacts, under elastic deformation, the right surface of the second sidewall 12. Furthermore, the leaf spring 56 is curved such that the intermediate area 56C in the up-down direction bulges toward the right surface of the second sidewall 12. Owing to this simple configuration of the plate shaped member 53 and the leaf spring 56, the biasing member 50 can be easily inserted by sliding it between the right surface of the second sidewall 12 and the left surface of the heat exchanging body 20. Furthermore, the biasing member 50 can reliably press the heat exchanging body 20 toward the first sidewall 11 by using the biasing force F1 of the elastically deformed leaf spring 56.

In addition, as shown in FIGS. 2 to 4, the plate shaped member 53 has a plurality of (e.g., first and second) protruding parts 51, 52 that protrude rightward toward the first sidewall 11 and make contact with the left surface of the heat exchanging body 20. The leaf spring 56 makes contact with the right surface of the second sidewall 12. Furthermore, as shown in FIG. 7, the first insertion hole 31 of the first sidewall 11 overlaps (intersects) the lower end portion of the right surface 51A of the first protruding part 51 in the left-right direction, and the second insertion hole 32 of the first sidewall 11 overlaps (intersects) the upper end portion of the right surface 52A of the second protruding part 52 in the left-right direction. Owing to this configuration, the biasing force F1 that the leaf spring 56 of the biasing member 50 applies to the heat exchanging body 20 reliably acts on the elastic seal members 40 via the protruding parts 51, 52 of the plate shaped member 53 and the heat exchanging body 20 and therefore can reliably cause the elastic seal members 40 to undergo compressive deformation.

Furthermore, as shown in FIGS. 4 and 6, the lower end part 56D of the leaf spring 56 is affixed to the plate shaped member 53 by being spot welded to the plate shaped member 53 at a plurality of joining points 56P. On the other hand, the upper end part 56U of the leaf spring 56 merely makes contact with the plate shaped member 53. Owing to this configuration, the restoring force of the leaf spring 56 tends to weaken (is reduced) in an initial stage when the biasing member 50 is being inserted between the right surface of the second sidewall 12 and the left surface of the heat exchanging body 20. That is, the characteristics of a nonlinear spring can be easily imparted to the leaf spring 56. As a result, the biasing member 50 can be easily inserted between the right surface of the second sidewall 12 and the left surface of the heat exchanging body 20. In addition, after the biasing member 50 has been inserted between the right surface of the second sidewall 12 and the left surface of the heat exchanging body 20, the leaf spring 56 elastically deforms so as to suitably follow any dimensional variation of the heat exchanging body 20 and thereby can reliably exert the biasing force F1; therefore, the heat exchanging body 20 can be reliably pressed toward the first sidewall 11 by the biasing force F1.

Working Example 2

Figure 9:
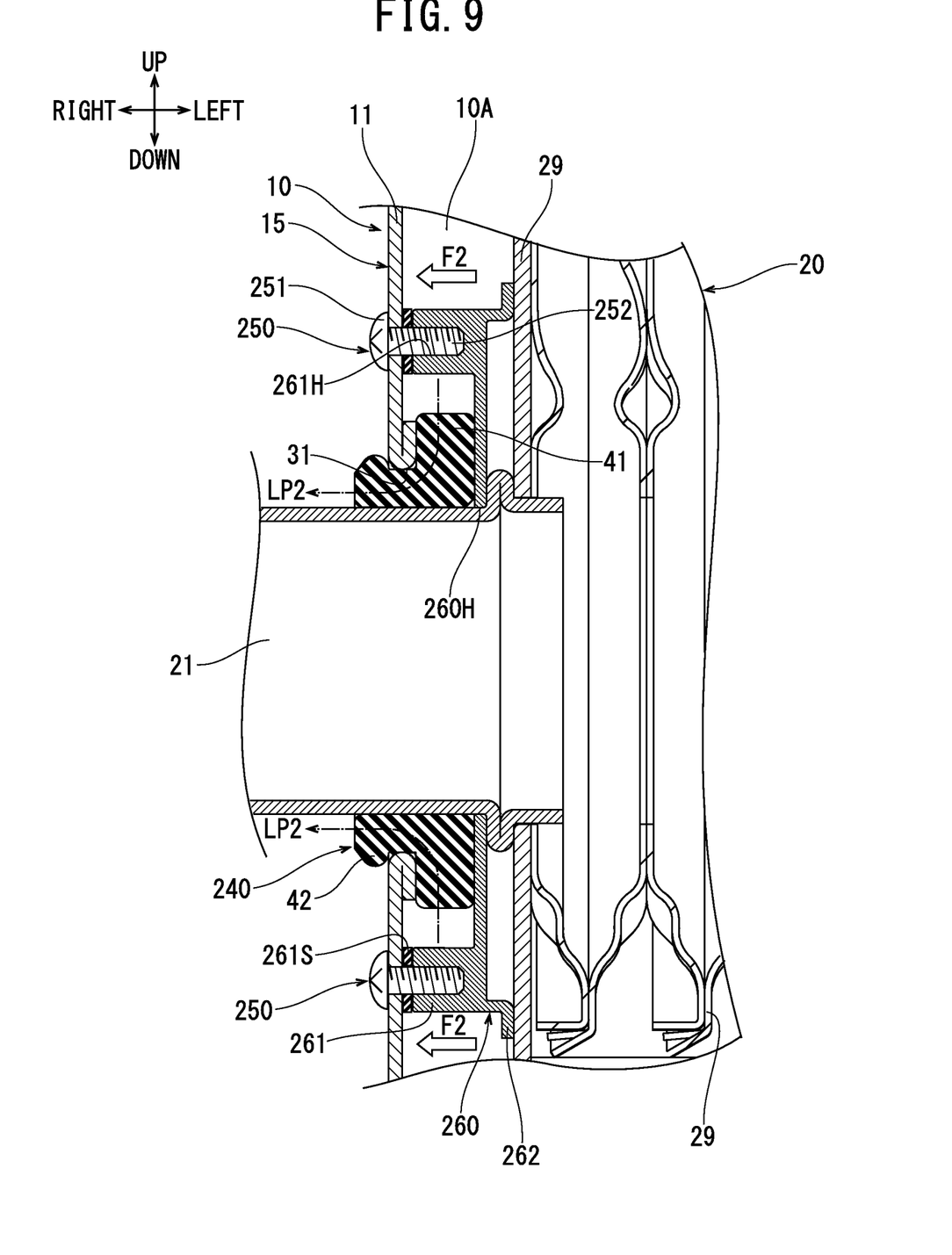
FIG. 9 is an enlarged cross sectional view of the principal parts, similar to that shown in FIG. 5, relating to the heat exchanger of working example 2.

As shown in FIG. 9, in the heat exchanger of working example 2, elastic seal members 240 are used that differ from the first and second elastic seal members 40 according to the heat exchanger 1 of working example 1. In addition, in this heat exchanger, a plurality of screws 250 is used instead of the biasing member 50 according to working example 1. The plurality of screws 250 thus serve as another example of a "biasing member" according to the present disclosure. Furthermore, in this heat exchanger, the heat exchanging body 20 comprises connecting members 260. The connecting members 260 are fixed to the right surface of the heat exchanging body 20 at locations corresponding to the supply pipe 21 and the discharge pipe 22 and are integrated with the heat exchanging body 20.

In FIG. 9, the cross sectional configurations of only the supply pipe 21 and the vicinity thereof are shown; however, because these are the same as the cross sectional configurations of the discharge pipe 22 and the vicinity thereof, the illustration and explanation of the latter are omitted.

Other structural elements of working example 2 are the same as those of working example 1. Consequently, structural elements that are identical to those in working example 1 are assigned identical symbols, and explanations thereof are omitted or simplified.

The connecting member 260 is substantially a disk-shaped member made of metal. A tubular part 261 and a flange part 262 are formed on (at) an outer circumferential edge of the connecting member 260.

The tubular part 261 is a circular tubular body that protrudes rightward from the outer circumferential edge of the connecting member 260. A plurality of screw holes 261H is formed in the tubular part 261. The screw holes 261H are recessed leftward from a right end surface of the tubular part 261 and are arranged equispaced in the circumferential direction of the connecting member 260. A circular ring-shaped (e.g., annular) seal ring 261S is affixed to the right end surface of the tubular part 261 such that the screw holes 261H are open.

The flange part 262 extends leftward in a circular tubular shape from the outer circumferential edge of the connecting member 260 and subsequently protrudes in a flange shape in a radially outward direction of the connecting member 260. The flange part 262 is joined, by brazing and in a highly airtight manner, to the right surface of the heat exchanging body 20.

A round hole 260H is formed in the center of the connecting member 260 so that it passes through in the left-right direction. The supply pipe 21 is inserted through the round hole 260H. The circumferential edge of the round hole 260H of the connecting member 260 is joined, by brazing and in a highly airtight manner, to a base portion of the supply pipe 21.

In contrast to the elastic seal members 40 according to working example 1, the elastic seal member 240 of working example 2 is modified such that the lip 43 is eliminated and the diameters of the seal main body 41 and the engaging part 42 are reduced. The left surface of the seal main body 41 makes tight contact (preferably air-tight contact) with the circumferential edge that surrounds the round hole 260H on the right surface of the connecting member 260. The right surface of the seal main body 41 makes tight contact (preferably air-tight contact) with the circumferential edge that surrounds the first insertion hole 31 on the left surface of the first sidewall 11. The engaging part 42, which is substantially tube shaped, protrudes rightward from the seal main body 41, passes through the first insertion hole 31 of the first sidewall 11, and subsequently widens and engages the circumferential edge that surrounds the first insertion hole 31 on the right surface of the first sidewall 11. The inner tube surfaces of the seal main body 41 and the engaging part 42 make tight contact (preferably air-tight contact) with the outer tube surface of the supply pipe 21.

A head 251, which is one end of each screw 250, is moored against (is firmly pressed against) the first sidewall 11. A thread 252, which is the other end of each screw 250, is screwed into the corresponding screw hole 261H in the connecting member 260 of the heat exchanging body 20. Consequently, each screw 250 exerts a biasing force F2, via the seal ring 261S, that pulls the heat exchanging body 20 rightward toward the first sidewall 11. As a result, the seal ring 261S undergoes compressive deformation between the right end surface of the tubular part 261 and the left surface of the first sidewall 11, and therefore both gaps are sealed.

In the heat exchanger of working example 2 thus configured, the biasing forces F2 of the plurality of the screws 250 act upon each of the elastic seal members 240 and thereby cause the elastic seal members 240 to undergo compressive deformation in the left-right direction. As a result, the elastic seal members 240 can reliably block potential leakage paths LP2 that extend from the first passageway 10A to the outside of the outer box 10 via the first and second insertion holes 31, 32.

Accordingly, in the heat exchanger of working example 2, the same as in the heat exchanger 1 of working example 1, leakage of the combustion exhaust gas from the first passageway 10A to the outside of the outer box 10 via the first and second insertion holes 31, 32 can be reliably impeded.

The present disclosure was explained above, in part, in accordance with working examples 1, 2, but the present disclosure is not limited to the above-mentioned working examples 1, 2, and it is understood that variations and modifications may be effected as appropriate without departing from the spirit and scope of the disclosure.

In working examples 1, 2, the first fluid is combustion exhaust gas and the second fluid is water, but working examples 1, 2 are not limited to this configuration. A configuration in which the first fluid, which is a heat medium or a coolant, circulates (flows) through a first passageway, and a second fluid, which is a fluid to be heated or a fluid to be cooled, circulates (flows) through a second passageway; a configuration in which the second fluid, which is a heat medium or a coolant, circulates (flows) through the second passageway, and a first fluid, which is a fluid to be heated or a fluid to be cooled, circulates (flows) through the first passageway; and the like are included in the present disclosure. In addition to combustion exhaust gas, water vapor, oil, and the like are included as examples of the heat medium. Cooling water, air conditioner gas (refrigerant), and the like are included as examples of the coolant (or medium to be heated). Liquids, such as water, and gases, such as air, are included as examples of the fluid to be heated and the fluid to be cooled.

In working examples 1, 2, the peripheral wall 15 has a square-tube shape but it is not limited thereto. For example, the peripheral wall may have an oval tube shape, a hexagonal tube shape, any kind of prism tube shape, or the like.

In working example 1, the plate shaped member 53 of the biasing member 50 makes contact with the heat exchanging body 20, and the leaf spring 56 makes contact with the second sidewall 12, but working example 1 is not limited to this configuration. For example, the biasing member 50 may be inverted such that the leaf spring 56 makes contact with the heat exchanging body 20 and the plate shaped member 53 makes contact with the second sidewall 12.

In working examples 1, 2, a heat exchanging body, in which a plurality of plates is stacked, is used, but a heat exchanging body comprising a tube in which the second fluid circulates may also be used in some aspects of the present teachings. Furthermore, the outer box may have a bottom wall in addition to a tube shaped peripheral wall.

Aspects of the present teachings can also be used in, for example: a hot water heater that has only a hot water supply function; a hot water heater that has a hot water supply function and a bath reheating function; a heat source apparatus for indoor heating that circulates and supplies hot water to a hot water indoor heating terminal; a heat source apparatus for heating that supplies hot water or hot air to an object to be heated; a heat source apparatus for cooling that supplies cold water or cold air to an object to be cooled; or the like.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved heat exchanges, such as, e.g., for tankless water heaters.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Heat exchanger
11 First sidewall
15 Peripheral wall
10A First passageway
10 Outer box
20A Second passageway
20 Heat exchanging body
21 Supply pipe
22 Discharge pipe
31, 32 Plurality of insertion holes
LP1 Potential leakage paths
40, 240 Elastic seal member
F1, F2 Biasing force
50, 250 Biasing member (50: elastically-deformable spacer; 250: screw)
29 Plurality of plates
12 Second sidewall
10H Insertion opening
53 Plate shaped member
56 Leaf spring
56C Intermediate area of leaf spring in second direction
51, 52 Plurality of protruding parts
56D End part located on the side opposite the insertion opening of the leaf spring in the second direction (lower end part of leaf spring)
251 One end of a biasing member (head of a screw)
252 Other end of a biasing member (thread of a screw)

The invention claimed is:

1. A heat exchanger for a hot water heater, comprising:
a heat exchanging body disposed within an outer box;
a supply pipe and a discharge pipe in fluid communication with a fluid passageway within the heat exchanging body and respectively extending through first and second insertion holes in the outer box;
first and second elastic seal members respectively disposed around the supply pipe and the discharge pipe and being located between a first sidewall of the outer box and the heat exchanging body; and
at least one resilient biasing member in a space between the outer box and the heat exchanger exerting a resilient biasing force on the elastic seal members in a first direction that is parallel to the direction that the insertion holes pass through the outer box, thereby maintaining the elastic seal members in a state of compressive deformation and contacting the outer box and the heat exchanging body in an air-tight manner to block potential leakage paths via the first and second insertion holes;

wherein:
the first and second elastic seal members are annular and made of an elastomer;
each of the first and second elastic seal members includes a seal main body having a first side that contacts the first sidewall of the outer box and a second opposite side that contacts the heat exchanging body;
the heat exchanging body has a plurality of plates stacked along the first direction, each plate of the plurality of plates being in contact with at least one other plate of the plurality of plates;
the outer box further includes a second sidewall that opposes the first sidewall in the first direction;
the at least one resilient biasing member is disposed between the second sidewall and the heat exchanging body and exerts the resilient biasing force that presses the heat exchanging body toward the first sidewall;
the at least one resilient biasing member comprises: a plate shaped member, which makes contact with one of the second sidewall and the heat exchanging body, and a leaf spring that is affixed to the plate shaped member and makes contact, in an elastically deformed state, with the other of the second sidewall and the heat exchanging body;
a direction parallel to the direction in which the at least one resilient biasing member is configured to be inserted, through the insertion opening, between the second sidewall and the heat exchanging body is defined as a second direction, which is perpendicular to the first direction; and
the leaf spring is bent or curved such that an intermediate area in the second direction bulges toward the other of the second sidewall and the heat exchanging body.

2. The heat exchanger according to claim 1, wherein each of the first and second elastic seal members includes:
an engaging part connected to the seal main body, the engaging part engaging a circumferential edge of the respective insertion hole.

3. The heat exchanger according to claim 2, wherein each of the first and second elastic seal members includes a cylindrical surface that snugly contacts the supply pipe or the discharge pipe.

4. The heat exchanger according to claim 2, wherein each of the first and second elastic seal members includes a lip that extends radially inwardly and contacts the supply pipe or the discharge pipe.

5. The heat exchanger according to claim 1, wherein:
the plate shaped member has a plurality of protruding parts that protrude toward the first sidewall and make contact with the heat exchanging body;
the leaf spring makes contact with the second sidewall;
the insertion holes respectively overlap the corresponding protruding parts as viewed along the first direction; and
the leaf spring is affixed to the plate shaped member on only the end part located on the side opposite the insertion opening in the second direction.

6. The heat exchanger according to claim 1, wherein:
a peripheral wall of the outer box comprises the first sidewall and partitions the fluid passageway, through which a first fluid circulates;
the heat exchanging body is housed inside the first passageway of the outer box and defines a second fluid passageway through which a second fluid circulates;

the second passageway is fluidly connected to the supply pipe and to the discharge pipe; and the heat exchanging body is configured to perform heat exchange between the first fluid and the second fluid.

7. The heat exchanger according to claim 6, wherein:

the first fluid is a combustion exhaust gas; and the second fluid is water.

8. The heat exchanger according to claim 6, wherein:

the outer box has an insertion opening, in which one end side of the peripheral wall is open;

the heat exchanging body, the supply pipe, and the discharge pipe are configured to be housed, by being inserted through the insertion opening and into the fluid passageway of the outer box; and the at least one resilient biasing member is configured to be inserted through the insertion opening.

9. The heat exchanger according to claim 1, wherein:

the first fluid is a combustion exhaust gas; and the second fluid is water.

* * * * *